Jan. 20, 1970       F. A. SEEDHOUSE       3,490,347
MICROSCOPE CAMERA ADAPTER
Filed Sept. 20, 1967                     2 Sheets-Sheet 1
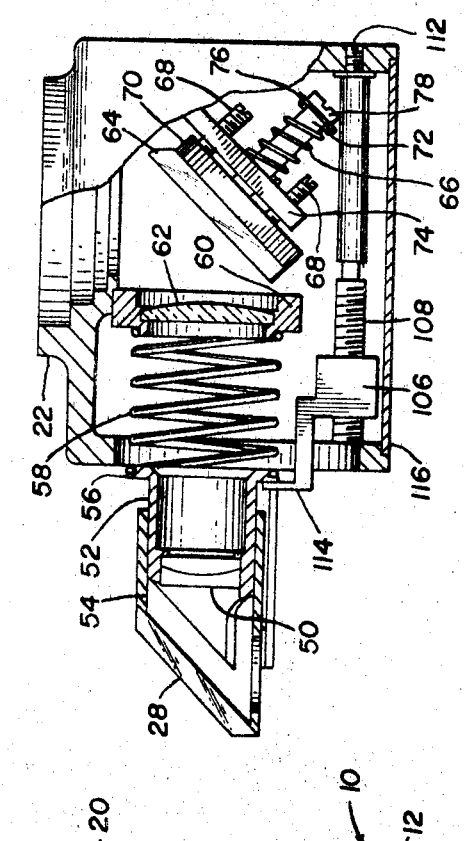
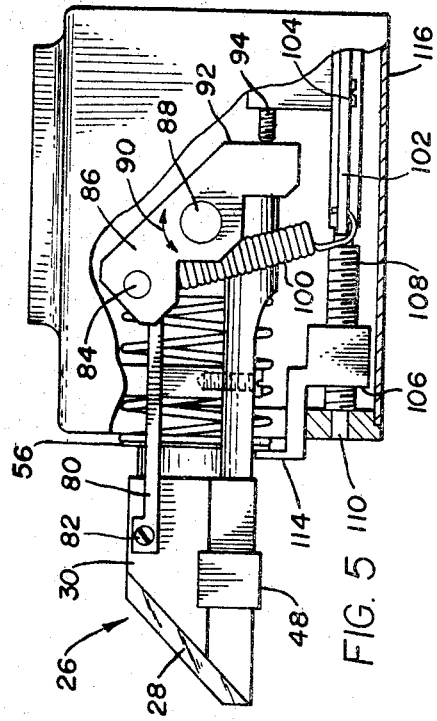
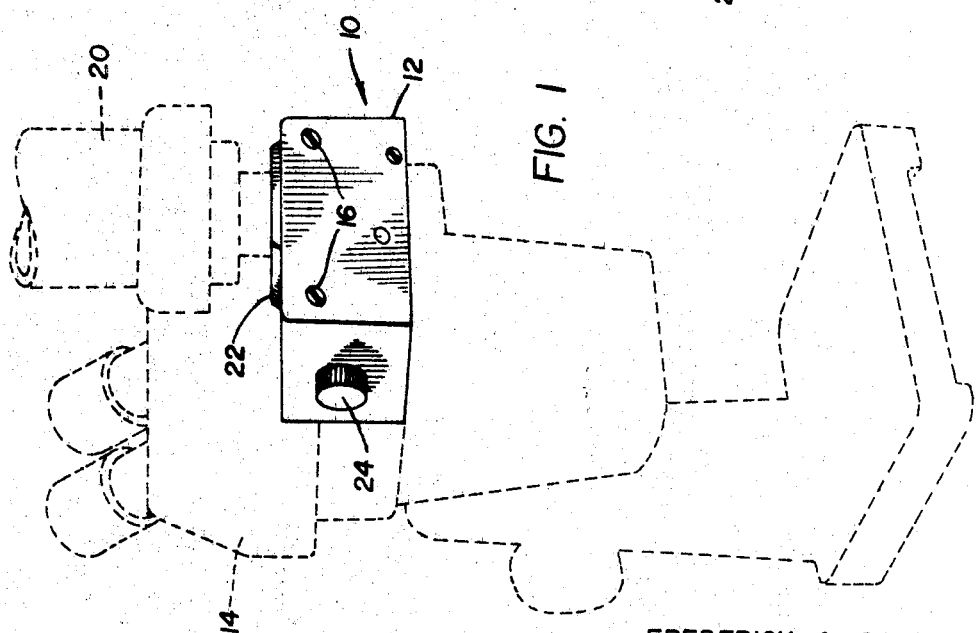
FREDERICK A. SEEDHOUSE
INVENTOR.
BY Frank C. Parker
ATTORNEY Jan. 20, 1970   F. A. SEEDHOUSE   3,490,347
MICROSCOPE CAMERA ADAPTER
Filed Sept. 20, 1967   2 Sheets-Sheet 2

FREDERICK A. SEEDHOUSE
INVENTOR.

BY Frank C. Parker

ATTORNEY 3,490,347
MICROSCOPE CAMERA ADAPTER
Frederick A. Seedhouse, Chili, N.Y., assignor to Bausch
 & Lomb Incorporated, Rochester, N.Y., a corporation
 of New York
Filed Sept. 20, 1967, Ser. No. 669,180
Int. Cl. G03b 29/00
U.S. Cl. 95—12                                          9 Claims

ABSTRACT OF THE DISCLOSURE

A microscope camera adapter, designed to mount a camera on a microscope, of the type where an optical member is positioned in the optical path of the microscope in such a manner as to intercept an image formed by the optical system of the microscope. A movable optical element that is normally positioned internally of the camera adapter is movable into the optical path of the microscope. The camera is fixedly attached to the camera adapter in such a manner that allows normal use of the microscope while the camera is positioned to be available to photograph the images upon movement of the optical element into the optical path.

Background of the invention

The invention relates generally to a microscope camera adapter and more specifically to a camera adapter of the type wherein the image formed in the microscope may be intercepted and photographed by an external camera mounted on the body of the microscope.

The problem of photographing microscope images in the past has been solved by the mounting of a camera on the eyepiece structure of the microsope. In such a position, the image formed by the microscope is then photographed by the camera, with the camera afterwards removed and and the miscroscope placed back in normal service until another image is desired of being photographed. At this point the camera is then again mounted on the eyepiece structure with the second photograph being taken. Such past procedures were often burdensome and required quite lengthy, time-consuming removal and assembly of the camera onto the eyepiece structure.

With the advent of the stereomicroscope, this procedure was repeated with the camera placed on one of the eyepieces of the stereomicroscope and the operator utilizing the other eyepiece of the stereomicroscope to resolve the image. Such a use of dual eyepieces was an improvement over the former lengthy procedure with a single eyepiece, as heretofore outlined, but of course, destroyed the effectiveness of the stereomicroscope whenever an image was to be photographed since the operator had at his service only one eyepiece to utilize with the other eyepiece containing the camera for photographing the image.

Summary of the invention

In order to overcome these problems, I have devised a new and novel microscope camera adapter that is designed to mount on a microscope and allows the operator full use of the microscope while having the camera currently mounted on the camera adapter ready for use in photographing any image. The camera adapter of my invention comprises a movable optical element such as a mirror or prism which is movable by means hereinafter described, in and out of the optical path of the microscope. The movable optical element, along with other movable optical elements and fixed elements, are contained in a camera adapter body which is mounted to an exterior surface of the microscope at an appropriate place and contains the means whereby the camera may be fixedly attached to the adapter.

Accordingly, it is an object of this invention to provide a new and novel means whereby a camera may be permanently attached to a microscope without impairing the effectiveness of the microscope, said permanent mounting being made to a camera adapter which is in turn mounted exteriorally of the microscope body.

Another object of this invention is to provide a new and novel means whereby an image formed by the microscope may be intercepted by means of the camera adapter and deviated into the exteriorally mounted camera, thereby allowing the camera to photograph the image quickly and easily without requiring time consuming connections and reconnections to the microscope.

Another object of this invention is to provide a new and novel microscope camera adapter of the type wherein a single rotary motion of a positioning knob positions two optical elements independently of each other in a proper optical position to deviate an image formed in the microscope into a camera.

Still another object of this invention is to provide a new and novel microscope camera adapter of compact size wherein only the movable elements are contained within said camera adapter with the camera appropriately mounted to the exterior surface of said camera adapter and the entire assembly of camera adapter and camera being mounted to an exterior surface of the microscope whereby an operator is quickly and easily able to resolve an image in the microscope and then quickly and easily able to photograph said image.

These and other objects of advantages of my invention will become apparent from the following description when read in conjunction with the accompanying drawings.

Brief description of the drawings

FIGURE 1 is a general perspective view of the camera adapter mounted on a microscope and having a camera permanently attached thereto.

FIGURE 4 is a right sectional view taken along line 4—4 of FIGURE 3.

FIGURE 5 is a side elevational view, partially broken away, showing the operating means whereby the lens elements are moved.

Description of the preferred embodiment

Figures 2, 3:
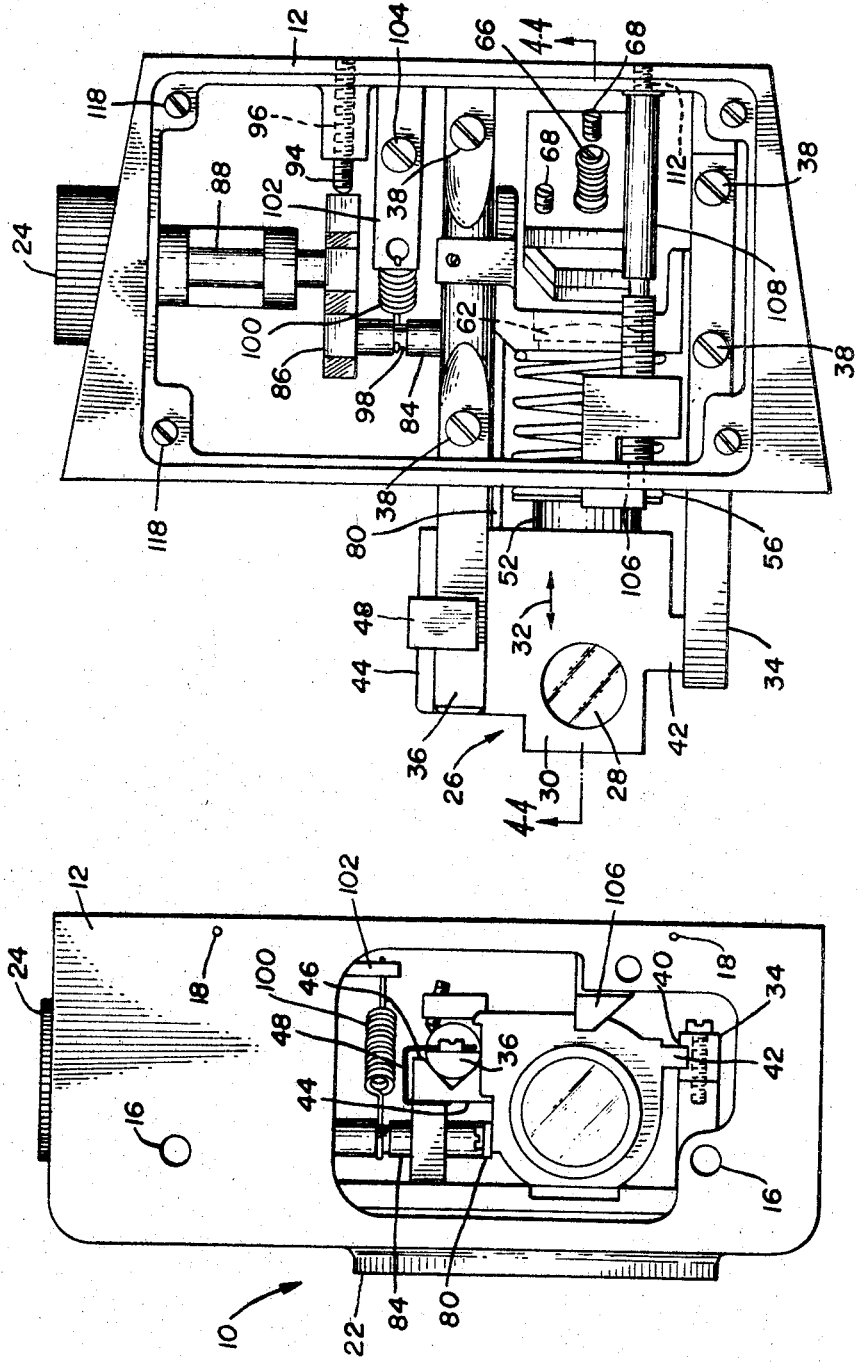
FIGURE 2 is a side elevational view of the camera adapter showing the optical parts contained therein.
FIGURE 3 is the bottom plan view, partially broken away, showing the basic components of my invention in the operative position.

Referring more particularly to the drawings wherein like characters of reference designate like parts throughout the various views, a camera adapter embodying my invention is shown generally by the numeral 10 in FIGURE 1 and comprises a body 12 containing a plurality of optical and mechanical parts that will be hereinafter described. The body 12 is fixedly attached to a microscope 14 by means of a pair of mounting bolts 16 which are positioned through holes contained in the body of the camera adapter 10 and are designed to thread into a pair of drilled and tapped holes contained on the body of the microscope 14. A pair of guide pins 18, shown in FIGURE 2 fixedly attached to the body 12 of the camera adapter 10, are utilized to position the camera adapter 10 in the proper position on the microscope 14 and to prevent rotational movement of the adapter 10 when mounted on the microscope body. Fixedly attached to the camera adapter 10, in a vertical manner is a camera 20 of any type capable of photographing a microscope image. The camera 20 is fixedly attached to the microscope body by means of a drilled and tapped annular flange 22 contained on an upper exterior surface of the camera adapter body 12.

Turning now to FIGURE 2, there is shown a side elevational view of the camera adapter with the camera detached therefrom. The camera adapter 10 contains a knob 24 which serves as the means for moving the optical elements of the camera adapter in a manner hereinafter described.

FIGURE 3 of the drawings is a bottom plan view of my invention wherein the first optical element of my invention is shown generally by the numeral 26 and comprises a mirror 28 or other optical means for deviating a path of light. The mirror 28 is contained on a mirror support 30 said mirror 28 and mirror support 30, being movable in the direction shown by the arrow 32. The first optical element assembly 26 is movable in the direction of the arrow 32 on a pair of spaced slidebars shown generally by reference numerals 34 and 36. The slidebars 34 and 36 are rigidly attached to the body 12 by means of screws 38 which are contained in drilled and tapped holes in the body 12.

As shown in FIGURE 2, the slidebar 34 is formed in the general shape of a rectangular bar containing a notch 40 on the inner side thereof, said notch receiving a matching protuberance 42 contained on the first optical element assembly 26. The notch 40 serves as a guide member or track for the protuberance to slide on.

The other slide bar 36 in the embodiment shown, takes the general shape of an elongated semi-circular rod. The first optical element assembly 26 contains a second protuberance 44 in juxtaposition with the slide bar 36 and contains a V-shaped notch 46 on the lower side thereof. The V-shape notch 46 rides on the upper portion of the slide bar 36 when the first optical element assembly 26, is moved in the direction shown by the arrow 32. A spring clip 48 is utilized to retain the protuberance 44 with its V-shape notch 46 contained on the lower portion thereof in sliding contract with the slide bar 36.

Turning now to FIGURE 4, there is shown a second optical element 50 which is contained within a cylindrical tube 52 by means well known in the art. The cylindrical tube 52 is of a diameter somewhat smaller than the diameter of a matching hole 54 contained in the mirror support body 30 and is designed to enable the cylindrical tube 52 to slide in and out of the hole 54 independently of the motion of the mirror support body 30 as will be hereinafter described.

The cylindrical tube 52 contains a circular flange 56 on one end thereof, said circular flange 56 serving as the grounding means for the lens return spring 58. The other grounding means for the lens return spring 58 is a protuberance 60 formed internally of the body 12. The protuberance 60 also contains a third optical element 62 fixed therein by means well known in the art.

The balance of the optical system for the camera adapter 10 comprises a fourth optical element 64 adjustably attached to the body 12 by means of a spring 66 and an adjusting screw 68. The fourth optical element 64 may take the shape of a mirror or other means sufficient to deviate a light ray and is attached to an optical mount 70 by well known means. The optical mount 70 contains a rodlike member 72 on one side passing through an internal protuberance 74 of the body 12 and through the spring 66. A washer 76 in combination with a screw 78 is utilized to retain the spring 66 in its operative position.

From the foregoing it can be seen that the use of the adjusting screws 68 in combination with the resilient action of the spring 66 provides that precise adjustment may be made of the fourth optical element 64 contained within the camera adapter body 12.

Referring now to FIGURE 5, taken in conjunction with FIGURE 3, there will be described the mechanical parts of my invention utilized to effect the motion of the first optical element assembly 26 and the second optical element 50, as shown by the directional arrow 32. Pivotably connected to the first optical element assembly 26 is a lever 80, said pivot connection being obtained by means of a screw 82 attached to a drilled and tapped hole contained in the mirror support body 30. Pivotably attached to the other end of the lever 80 is a pin 84 which is rigidly fastened to a cam member 86, said cam member being rotated around a pin 88.

The pin 88 is channeled in the body 12 by well known means and is connected to the knob 24 moves in the direction shown by the arrrow 90. The cam member 86 contains a stopping surface 92 which bears against a stopping screw 94. The stopping screw 94 is contained in a drilled and tapped hole 96 in the body 12. The pin 84 contains an annular groove 98 around which one end of a spring 100 is fastened. The other end of the spring 100 is fastened to a plate 102 which is rigidly held to the body 12 by means of a screw 104 attached to a drilled and tapped hole contained in the body 12. The spring 100, in the manner hereintofore described, serves as an over the center spring which functions to move the optical elements to one of two positions which will be hereinafter described.

Serving as a stopping means for the cylindrical tube 52 is the stopping member 106 which is adjustably held on the adjustment screw 108 in the manner shown in FIGURES 3, 4 and 5. The adjustment screw 108 is retained in the body 12 at one end thereof by a bearing member 110 and at the other end thereof by a bearing member 112. The stopping member 106 contains a protruding leg 114, said leg contacting the circular flange 56 contained on the cylindrical tube 52 and serves as the means of assuring a proper adjustment of the second optical element 50.

A cover plate 116 is retained in place by means of four screws 118 which are fixed in drilled and tapped holes contained in the body 12 and serves as a means for gaining access to the interior of the camera adapter 10 for assembly and servicing.

Operation

In operation, the camera adapter 10 is positioned on the microscope body 14 by means of the pair of guide pins 18 and is rigidly held in place by means of the pair of mounting bolts 16. An appropriate camera 20 is rigidly fastened to the camera adapter 10 by means of the annular flange 22 contained on the upper exterior surface of the camera adapter body 12. At this point the camera 20 is in a fixed position mounted to the camera adapter 10 which in turn is mounted to the microscope body 14 and is ready to take pictures of any microscope image formed with minor adjustments as will be hereinafter detailed.

The first and second optical element assemblies 26 and 50 are normally contained within the body 12 of the camera adapter 10 out of the optical path of the microscope 14. Whenever the opeartor desires to secure a photograph of an image formed in the microscope 14, he simply rotates the knob 24 which in turn rotates the cam member 86 driving the lever 80 in a linear manner. This linear movement is transferred to the mirror support body 30 by means of the screw 82 and moves the mirror support body along the pair of slide bars 34 and 36 to the operative position as determined by the stopping screw 94. The stopping screw 94 is adjusted to allow the mirror support body 30 to be positioned in the proper position in the optical path of the microscope 14. Once the camera adapter 10 is mounted on the microscope 14 and the stopping screw 94 properly adjusted, any rotation of the knob 24 will automatically position the first and second optical element assemblies 26 and 50 in their proper position by means of the over the center spring 100 in conjunction with the stopping screw 94. The action of the spring 100 is such that when ever the cam member 86 is rotated over the center position of the pin 88, the spring action 100 rotates the cam member 86 to the operative position as determined by the stopping screw 94.

Inasmuch as the cylindrical tube 52 containing the second optical element 50 slides freely within the mirror support body 30, any movement of the mirror support body 30 is necessary followed by the cylindrical tube 52 due to the force of the lens return spring 58. The lens return spring 58, which is grounded on one end on the protuberance 60 in the body 12, will move the cylindrical tube 52, by spring means to its operative position as determined by the stopping member 196. The stopping member 106 being movably mounted on the adjustment screw 108, may be moved to position the stopping member 106 with its protruding leg 114 at the desired position to achieve a proper focus through the optical system. Once the stopping member 106 is properly positioned, then any movement of the first optical element assembly outward will in turn automatically position the second optical element assembly 50 in its proper position.

Minor adjustments in the deviation of the image into the camera 20 are made by means of the adjusting screw 68 with the spring 66 holding the fourth optical element assembly in its properly adjusted position.

In a less refined modification of my invention and one wherein the second optical element 50 is not adjustable, due to the needs of the oeprator, the second optical element 50 may be fixedly attached to the mirror support body 30 of the first optical element assembly 26. In such a design, movement of the first optical element assembly 26 would automatically position the second optical element 50 since it would be mechanically fastened to the mirror support body 30. Such a modification as this would then obviate the need for the lens return spring 58, the cylindrical tube 52, the stopping member 106 and the adjustment screw 108, making, as beforementioned, a less refined version of my invention.

However, such a refinement would be within the spirit and scope of my invention and from the foregoing, it would be seen that I have provided for means for accomplishing all of the objects and advantages of the invention. Nevertheless, it is apparent that many changes in the details of construction, arrangement of parts or assembly of parts may be made without departing from the spirit and the scope of the invention and the invention is not to be limited in the exact manner shown and described as only the preferred manners and environments have been given by way of illustration.

Having described my invention, I claim:

1. A microscope camera adapter designed to mount a camera on a microscope of the type where an optical member may be positioned in the optical path of the microscope whereby an image formed by the optical system of the microscope may be intercepted and photographed by the camera, the combination of
   (a) a first optical element assembly movable in and out of the optical path of the microscope,
   (b) a second optical element optically aligned with said first optical element assembly and movable independently of the motion of the first optical element,
   (c) first means operatively constructed for moving said second optical element along the optical path of the camera adapter, independently of the transversal of the first optical element,
   (d) a third optical element, fixed in the optical path of said camera adapter,
   (e) second means operatively constructed for retracting said first optical element out of the optical axis of the microscope to a pre-determined position in the camera adapter, said second means also serving to move the second optical element to a non-operative position, and
   (f) a fourth optical element, fixedly attached to the camera adapter and positioned in the optical path of said adapter in such a manner as to deviate light rays passing through said adapter into said camera.

2. The combination as defined in claim 1 and further characterized by said first optical element being movable on a pair of parallel spaced rod like members, said rod like members fixedly attached interiorally of said camera adapter and extending outwardy of said camera adapter a pre-determined length whereby said first optical element may be positioned in the optical path of the microscope when said camera adapter is mounted on the microscope.

3. The combination as defined by claim 1 and further characterized by said first means comprising a spring member interposed between said second optical element and said third optical element, said spring member having one end grounded on the third optical element with the other end of the spring member grounded on the second optical element.

4. The combination as defined by claim 1 and further characterized by the second means comprising a lever triggerably attached at one end to the first optical element and at the other end to a pin fixedly attached to a cam member, means external of said camera adapter for rotating said cam member whereby said external rotation movement is transferred to a longitudinal movement of said lever thereby allowing said first optical element to be moved along the optical path of said camera adapter.

5. The combination as defined by claim 4 and further characterized by said cam member containing stopping means, said stopping means comprising a flat surface on the cam member, a positioning screw contained in the camera adapter, said flat surface grounding against said positioning screw and serving as the means to accurately determine the stopping position which said first optical element will remain in when said first said optical element is positioned in the optical path of the microscope.

6. A microscope camera adapter designed to mount a camera on a microscope of the type whereby an optical member may be positioned in the optical path of the microscope and an image formed by the optical system of the microscope may be photographed by said camera, the combination of
   (a) a pair of movable optical elements, said optical elements being movable in a path substantially perpendicular to the optical path of the microscope, said elements also being movable in and out of said camera adapter,
   (b) a pair of fixed optical elements, fixedly attached interior of the camera adapter and in an optical alignment with said pair of movable optical elements, one of said fixed optical elements serving as a means to deviate a light ray passing through said camera adapter in a manner substantially perpendicular to the direction of the ray passing through said pair of movable optical elements,
   (c) means operatively constructed for moving said pair of movable optical elements into a proper optical alignment whereby one of said pair of movable optical elements is interposed in the optical path of the microscope when said camera adapter is attached to said microscope in such a manner as to intercept a light beam contained in the microscope and allow said light beam to pass through said camera adapter to said camera, and
   (a) a body containing said pair of fixed optical elements, said pair of movable optical elements and said means for moving said movable optical elements.

7. The combination as defined by claim 6 and further characterized by said body comprising a plurality of openings contained in the sides thereof, said openings being characterized as a first opening serving as a means of allowing the pair of movable optical elements to be moved in and out of the camera adapter, a second opening serving as a means whereby the camera may be fixedly attached to the camera adapter, a third opening serving as a means allowing the movable elements to be properly positioned, a fourth opening serving as access means whereby the operative elements of said camera adapter may be assembled to the body.

8. The combination as defined by claim 7 and further characterized by said body containing positioning means whereby said camera adapter may be accurately positioned in a proper optical position on the microscope.

9. A microscope camera adapter designed to mount a camera on a microscope of the type where an optical member may be positioned in the optical path of the microscope whereby an image formed by the optical system of the microscope may be intercepted, deviated through the adapter and deviated into and photographed by the camera, the combination of
   (a) a first optical element movable in and out of the optical path of the microscope,
   (b) a second optical element carried by and optically aligned with said first optical element and movable in cooperation with the motion of said first optical element,
   (c) means operatively constructed for moving said first optical element and said second optical element along the optical path of the camera adapter, and
   (d) a third optical element fixedly attached to the camera adapter and positioned in the optical path of said adapter in such a manner as to deviate an image passing through said adapter into said camera.

References Cited

UNITED STATES PATENTS

| | | | |
|---|---|---|---|
| 2,737,079 | 3/1956 | Brown et al. | 95—12 X |
| 2,910,913 | 11/1959 | Michel | 95—12 X |
| 3,008,396 | 11/1961 | Mito | 95—12 |

NORTON ANSHER, Primary Examiner

W. A. SIVERTSON, Assistant Examiner